(12) United States Patent
Koskela et al.

(10) Patent No.: US 12,445,879 B2
(45) Date of Patent: Oct. 14, 2025

(54) INDICATING BEAM FAILURE IN MULTIPLE TRANSMISSION RECEPTION POINT OPERATION

(71) Applicant: Nokia Technologies Oy, Espoo (FI)

(72) Inventors: Timo Koskela, Oulu (FI); Samuli Heikki Turtinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 113 days.

(21) Appl. No.: 18/552,317

(22) PCT Filed: Mar. 11, 2022

(86) PCT No.: PCT/EP2022/056312
§ 371 (c)(1),
(2) Date: Sep. 25, 2023

(87) PCT Pub. No.: WO2022/200078
PCT Pub. Date: Sep. 29, 2022

(65) Prior Publication Data
US 2024/0179548 A1    May 30, 2024

(30) Foreign Application Priority Data
Mar. 26, 2021    (FI) ...................................... 20215353

(51) Int. Cl.
*H04W 24/08*    (2009.01)
*H04L 5/00*    (2006.01)

(52) U.S. Cl.
CPC ........... *H04W 24/08* (2013.01); *H04L 5/0051* (2013.01)

(58) Field of Classification Search
None
See application file for complete search history.

(56) References Cited

U.S. PATENT DOCUMENTS

2020/0228183 A1    7/2020    Venugopal et al.
2020/0288371 A1    9/2020    Zhou et al.
(Continued)

FOREIGN PATENT DOCUMENTS

EP    3855661 A1    7/2021
GB    2575691 A    1/2020
(Continued)

OTHER PUBLICATIONS

Notice of Allowance received for corresponding Japanese Patent Application No. 2023-558970, dated Nov. 19, 2024, 3 pages of Notice of Allowance and No. page of translation available.
(Continued)

*Primary Examiner* — Faruk Hamza
*Assistant Examiner* — Cassandra L Decker
(74) *Attorney, Agent, or Firm* — Nokia Technologies Oy

(57) ABSTRACT

Disclosed is a method comprising detecting a beam failure on at least one transmission reception point of a plurality of transmission reception points. One or more beam failure indication data is included into a first medium access control (MAC) control element (CE), wherein the one or more beam failure indication data indicates the beam failure detected on the at least one transmission reception point. The one or more beam failure indication data comprises at least a first bit that comprises a first value and a second value, wherein the first value of the first bit indicates a first transmission reception point at least on which the beam failure is detected. The first MAC CE comprising the one or more beam failure indication data is transmitted to an access point.

10 Claims, 8 Drawing Sheets

(56) References Cited

U.S. PATENT DOCUMENTS

| | | | |
|---|---|---|---|
| 2020/0350972 A1 | 11/2020 | Yi et al. | |
| 2021/0044342 A1 | 2/2021 | He | |
| 2022/0104036 A1* | 3/2022 | Zhou | H04B 7/088 |
| 2022/0109489 A1* | 4/2022 | Zhu | H04L 1/1614 |
| 2022/0132517 A1* | 4/2022 | Zhu | H04L 5/0051 |
| 2023/0353224 A1* | 11/2023 | Jia | H04W 24/10 |
| 2024/0007879 A1* | 1/2024 | Liu | H04W 74/0833 |

FOREIGN PATENT DOCUMENTS

| | | |
|---|---|---|
| WO | 2018/232090 A1 | 12/2018 |
| WO | 2019/233352 A1 | 12/2019 |
| WO | 2020/057665 A1 | 3/2020 |
| WO | 2021/240051 A1 | 12/2021 |

OTHER PUBLICATIONS

Notice of Allowance received for corresponding European Patent Application No. 22714384.9, dated Jan. 7, 2025, 7 pages.

"Discussion on beam management for MTRP", 3GPP TSG RAN WG1 #104-e, R1-2101600, Agenda: 8.1.2.3, NTT Docomo, Jan. 25-Feb. 5, 2021, 8 Pages.

Office action received for corresponding Japanese Patent Application No. 2023-558970, dated Oct. 8, 2024, 4 pages of office action and 6 pages of translation/summary available.

Office action received for corresponding European Patent Application No. 22714384.9, dated Oct. 16, 2024, 5 pages.

"CQI reporting for TDD", 3GPP TSG RAN WG1 Meeting #50, R1-073719, Agenda: 7.2.6, Philips, Aug. 20-24, 2007, 5 pages.

"New WID: Further enhancements on MIMO for NR", 3GPP TSG RAN Meeting #86, RP-193133, Agenda: 9.1.1, Samsung, Dec. 9-12, 2019, 5 pages.

"3rd Generation Partnership Project; Technical Specification Group Radio Access Network; NR; Medium Access Control (MAC) protocol specification (Release 16)", 3GPP TS 38.321, V16.3.0, Dec. 2020, pp. 1-156.

"3rd Generation Partnership Project; Technical Specification Group Radio Access Network; NR; Physical layer procedures for control (Release 16)", 3GPP TS 38.213, V16.4.0, Dec. 2020, pp. 1-181.

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

Li et al., "Beam Management in Millimeter-Wave Communications for 5G and Beyond", IEEE Access, vol. 8, Jan. 1, 2020, pp. 13282-13293.

Office action received for corresponding Finnish U.S. Appl. No. 20/215,353, dated Aug. 18, 2021, 6 pages.

Office action received for corresponding Finnish U.S. Appl. No. 20/215,353, dated Jan. 10, 2022, 6 pages.

International Search Report and Written Opinion received for corresponding Patent Cooperation Treaty Application No. PCT/EP2022/056312, dated Jun. 29, 2022, 13 pages.

"Further discussion on MTRP multibeam enhancement", 3GPP TSG RAN WG1 #103-e, R1-2007647, Agenda: 8.1.2.3, vivo, Oct. 26-Nov. 13, 2020, 8 pages.

"Moderator summary on M-TRP simultaneous transmission with multiple Rx panels (round 0)", 3GPP TSG RAN WG1 Meeting #104-e, R1-2101862, Agenda: 8.1.2.3, CATT, Jan. 25-Feb. 5, 2021, 39 pages.

Office action received for corresponding European Patent Application No. 22714384.9, dated May 21, 2024, 7 pages.

Office action received for corresponding Indian Patent Application No. 202347072646, dated Mar. 11, 2025, 7 pages.

Extended European Search Report received for corresponding European Patent Application No. 25172403.5, dated Jun. 6, 2025, 9 pages.

* cited by examiner

INDICATING BEAM FAILURE IN MULTIPLE TRANSMISSION RECEPTION POINT OPERATION

RELATED APPLICATION

This application was originally filed as PCT Application No. PCT/EP2022/056312, filed on Mar. 11, 2022, which claims priority from FI Application No. 20215353, filed on Mar. 26, 2021, each of which is incorporated herein by reference in its entirety.

FIELD

The following exemplary embodiments relate to wireless communication.

BACKGROUND

Some wireless communication networks are capable of utilizing multiple transmission reception point operation. It is desirable to provide solutions that enhance the overall effectiveness of such capabilities. For example, it may be beneficial to provide solutions that relate to beam failure recovery in multiple transmission reception point operation.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: detect a beam failure on at least one transmission reception point of a plurality of transmission reception points, the apparatus being configured to communicate with the plurality of transmission reception points; include one or more beam failure indication data into a first medium access control (MAC) control element (CE), wherein the one or more beam failure indication data indicates the beam failure detected on the at least one transmission reception point; wherein the one or more beam failure indication data comprises at least a first bit that comprises a first value and a second value, wherein the first value of the first bit indicates a first transmission reception point at least on which the beam failure is detected; and transmit, to an access point, the first MAC CE comprising the one or more beam failure indication data.

In an embodiment, the second value of the first bit indicates that no beam failure is detected at least on the first transmission reception point.

In an embodiment, the second value of the first bit indicates a second transmission reception point on which the beam failure is detected.

In an embodiment, the one or more beam failure indication data further comprises at least a first set of candidate beam information associated with the first transmission reception point and/or a second set of candidate beam information associated with the second transmission reception point.

In an embodiment, if the first bit is set to the first value, the first set of candidate beam information is included into the first MAC CE before including the second set of candidate beam information into the first MAC CE.

In an embodiment, the first bit is set to the first value, the one or more beam failure indication data further comprises at least a second bit indicating whether the beam failure is detected on the second transmission reception point.

In an embodiment, the one or more beam failure indication data further indicates whether the beam failure is for a transmission reception point level beam failure or for a cell-level beam failure.

In an embodiment, the transmission reception point level beam failure or the cell-level beam failure is indicated by a bitmap within the one or more beam failure indication data, wherein a length of the bitmap is determined based at least partly on a number of serving cells for which the beam failure is detected.

In an embodiment, the apparatus is further caused to: transmit, to the access point, a second medium access control (MAC) control element (CE) indicating a cell-level beam failure.

According to another aspect, there is provided an apparatus comprising means for: detecting a beam failure on at least one transmission reception point of a plurality of transmission reception points, the apparatus being configured to communicate with the plurality of transmission reception points; including one or more beam failure indication data into a first medium access control (MAC) control element (CE), wherein the one or more beam failure indication data indicates the beam failure detected on the at least one transmission reception point; wherein the one or more beam failure indication data comprises at least a first bit that comprises a first value and a second value, wherein the first value of the first bit indicates a first transmission reception point at least on which the beam failure is detected; and transmitting, to an access point, the first MAC CE comprising the one or more beam failure indication data.

According to another aspect, there is provided a method comprising: detecting, by a terminal device, a beam failure on at least one transmission reception point of a plurality of transmission reception points, the terminal device being configured to communicate with the plurality of transmission reception points; including, by the terminal device, one or more beam failure indication data into a first medium access control (MAC) control element (CE), wherein the one or more beam failure indication data indicates the beam failure detected on the at least one transmission reception point; wherein the one or more beam failure indication data comprises at least a first bit that comprises a first value and a second value, wherein the first value of the first bit indicates a first transmission reception point at least on which the beam failure is detected; and transmitting, by the terminal device, to an access point, the first MAC CE comprising the one or more beam failure indication data.

According to another aspect, there is provided a computer program comprising instructions for causing an apparatus to perform at least the following: detect a beam failure on at least one transmission reception point of a plurality of transmission reception points, the apparatus being configured to communicate with the plurality of transmission reception points; include one or more beam failure indication data into a first medium access control (MAC) control element (CE), wherein the one or more beam failure indication data indicates the beam failure detected on the at least one transmission reception point; wherein the one or more beam failure indication data comprises at least a first bit that comprises a first value and a second value, wherein the first value of the first bit indicates a first transmission reception point at least on which the beam failure is detected; and transmit, to an access point, the first MAC CE comprising one or more beam failure indication data.

According to another aspect, there is provided a computer readable medium comprising program instructions for causing an apparatus to perform at least the following: detect a beam failure on at least one transmission reception point of a plurality of transmission reception points, the apparatus being configured to communicate with the plurality of transmission reception points; include one or more beam failure indication data into a first medium access control (MAC) control element (CE), wherein the one or more beam failure indication data indicates the beam failure detected on the at least one transmission reception point; wherein the one or more beam failure indication data comprises at least a first bit that comprises a first value and a second value, wherein the first value of the first bit indicates a first transmission reception point at least on which the beam failure is detected; and transmit, to an access point, the first MAC CE comprising the one or more beam failure indication data.

According to another aspect, there is provided a non-transitory computer readable medium comprising program instructions for causing an apparatus to perform at least the following: detect a beam failure on at least one transmission reception point of a plurality of transmission reception points, the apparatus being configured to communicate with the plurality of transmission reception points; include one or more beam failure indication data into a first medium access control (MAC) control element (CE), wherein the one or more beam failure indication data indicates the beam failure detected on the at least one transmission reception point; wherein the one or more beam failure indication data comprises at least a first bit that comprises a first value and a second value, wherein the first value of the first bit indicates a first transmission reception point at least on which the beam failure is detected; and transmit, to an access point, the first MAC CE comprising the one or more beam failure indication data.

According to another aspect, there is provided an apparatus comprising at least one processor, and at least one memory including computer program code, wherein the at least one memory and the computer program code are configured, with the at least one processor, to cause the apparatus to: receive, from a terminal device, a medium access control (MAC) control element (CE) comprising at least a first bit comprising a first value and a second value, wherein the first value of the first bit indicates a beam failure on at least a first transmission reception point.

According to another aspect, there is provided an apparatus comprising means for receiving, from a terminal device, a medium access control (MAC) control element (CE) comprising at least a first bit comprising a first value and a second value, wherein the first value of the first bit indicates a beam failure on at least a first transmission reception point.

According to another aspect, there is provided a method comprising receiving, from a terminal device, a medium access control (MAC) control element (CE) comprising at least a first bit comprising a first value and a second value, wherein the first value of the first bit indicates a beam failure on at least a first transmission reception point.

According to another aspect, there is provided a computer program comprising instructions for causing an apparatus to perform at least the following: receive, from a terminal device, a medium access control (MAC) control element (CE) comprising at least a first bit comprising a first value and a second value, wherein the first value of the first bit indicates a beam failure on at least a first transmission reception point.

According to another aspect, there is provided a computer readable medium comprising program instructions for causing an apparatus to perform at least the following: receive, from a terminal device, a medium access control (MAC) control element (CE) comprising at least a first bit comprising a first value and a second value, wherein the first value of the first bit indicates a beam failure on at least a first transmission reception point.

According to another aspect, there is provided a non-transitory computer readable medium comprising program instructions for causing an apparatus to perform at least the following: receive, from a terminal device, a medium access control (MAC) control element (CE) comprising at least a first bit comprising a first value and a second value, wherein the first value of the first bit indicates a beam failure on at least a first transmission reception point.

According to another aspect, there is provided a system comprising at least a terminal device and an access point. The terminal device is configured to: detect a beam failure on at least one transmission reception point of a plurality of transmission reception points, the terminal device being configured to communicate with the plurality of transmission reception points; include one or more beam failure indication data into a first medium access control (MAC) control element (CE), wherein the one or more beam failure indication data indicates the beam failure detected on the at least one transmission reception point; wherein the one or more beam failure indication data comprises at least a first bit that comprises a first value and a second value, wherein the first value of the first bit indicates a first transmission reception point at least on which the beam failure is detected; and transmit, to the access point, the first MAC CE comprising the one or more beam failure indication data. The access point is configured to: receive, from the terminal device, the MAC CE comprising the one or more beam failure indication data.

According to another aspect, there is provided a system comprising at least a terminal device and an access point. The terminal device comprises means for: detecting a beam failure on at least one transmission reception point of a plurality of transmission reception points, the terminal device being configured to communicate with the plurality of transmission reception points; including one or more beam failure indication data into a first medium access control (MAC) control element (CE), wherein the one or more beam failure indication data indicates the beam failure detected on the at least one transmission reception point; wherein the one or more beam failure indication data comprises at least a first bit that comprises a first value and a second value, wherein the first value of the first bit indicates a first transmission reception point at least on which the beam failure is detected; and transmitting, to the access point, the first MAC CE comprising the one or more beam failure indication data. The access point comprises means for: receiving, from the terminal device, the MAC CE comprising the one or more beam failure indication data.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1A:
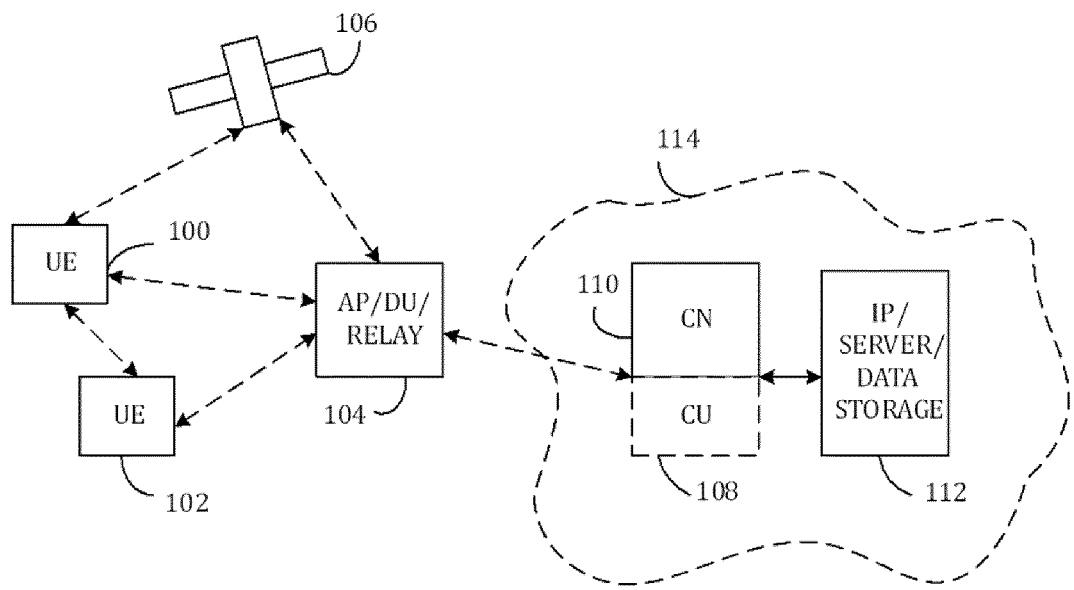
FIGS. 1A and 1B illustrate an exemplary embodiment of a cellular communication network.

FIG. 1A depicts examples of simplified system architectures showing some elements and functional entities, all being logical units, whose implementation may differ from what is shown. The connections shown in FIG. 1A are logical connections; the actual physical connections may be different. It is apparent to a person skilled in the art that the system may also comprise other functions and structures than those shown in FIG. 1A.

The exemplary embodiments are not, however, restricted to the system given as an example but a person skilled in the art may apply the solution to other communication systems provided with necessary properties.

The example of FIG. 1A shows a part of an exemplifying radio access network.

FIG. 1A shows user devices 100 and 102 configured to be in a wireless connection on one or more communication channels in a cell with an access node (such as (e/g)NodeB) 104 providing the cell. The physical link from a user device to a (e/g) NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1A) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1A by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a centralized unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g) NodeBs or may be a Home(e/g)nodeB.

Furthermore, the (e/g)nodeB or base station may also be split into: a radio unit (RU) comprising a radio transceiver (TRX), i.e. a transmitter (TX) and a receiver (RX); a distributed unit (DU) that may be used for the so-called Layer 1 (L1) processing and real-time Layer 2 (L2) processing; and a centralized unit (CU) or a central unit that may be used for non-real-time L2 and Layer 3 (L3) processing. Such a split may enable the centralization of CUs relative to the cell sites and DUs, whereas DUs may be more distributed and may even remain at cell sites. The CU and DU together may also be referred to as baseband or a baseband unit (BBU). The RU and DU may also be comprised into a radio access point (RAP). Cloud computing platforms may also be used to run the CU or DU. The CU may run in a cloud computing platform (vCU, virtualized CU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1A may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)Node Bs, may include, in addition to Home (e/g)NodeBs (H(e/g) nodeBs), a home node B gateway, or HNB-GW (not shown in FIG. 1A). A HNB Gateway (HNB-GW), which may be installed within an operator's network, may aggregate traffic from a large number of HNBs back to a core network.

When a UE is experiencing poor channel conditions, the UE may experience a beam failure. However, the UE may be capable of performing beam failure recovery (BFR) for example by using contention free random access (CFRA) or contention based random access (CBRA). In CFRA BFR, the UE may be provided with dedicated random access (RA) preamble resources that may correspond to a specific downlink (DL) reference signal (RS), i.e. a new candidate beam. CFRA BFR may therefore indicate to the network that a beam failure has been declared, and that the UE has initiated recovery and selected a new candidate beam.

In secondary cell (SCell) BFR, the UE may perform beam failure detection for one or more SCells that has been configured for the beam failure detection. This may be similar to primary cell (PCell) failure detection, wherein for a given SCell configured for the failure detection, the UE determines the respective set of beam failure detection resources, such as a set of q0 and/or a beam failure detection reference signal (BFD-RS), in an implicit or explicit manner. In the implicit configuration, the UE may determine the BFD-RS based on the reference signal indicated by the active transmission configuration indicator (TCI) states for the physical downlink control channel (PDCCH). In the explicit configuration, the UE may perform beam failure detection according to the reference signal configured by the network.

The physical layer, i.e. L1, determines, based on the downlink reference signal, such as synchronization signal block (SSB) or SS/PBCH (synchronization signal/physical broadcast channel) block or channel state information reference signal (CSI-RS), in a set of q0 whether or not to indicate a beam failure instance (BFI) to the higher layer, i.e. the medium access control (MAC) layer, which may also be referred to as L2. When all the reference signals in the set of q0 are in failure condition, i.e. when the hypothetical PDCCH block error rate (BLER) estimated on the reference signal is above a threshold value denoted as Qout, for example 10%, the UE indicates the BFI to the higher layer.

The MAC layer counts, in a BFI counter, the BFI indications for a given cell, and when it counts the configured number of BFI instances indicated by the lower layer for the respective cell (PCell or SCell), it initiates, or triggers, the beam failure recovery. The counter for BFI indications is supervised by a beam failure detection (BFD) timer. When the UE receives a new BFI indication, the BFD timer is started and the counter is incremented. If the BFD timer expires, the counter is reset.

Figure 2:
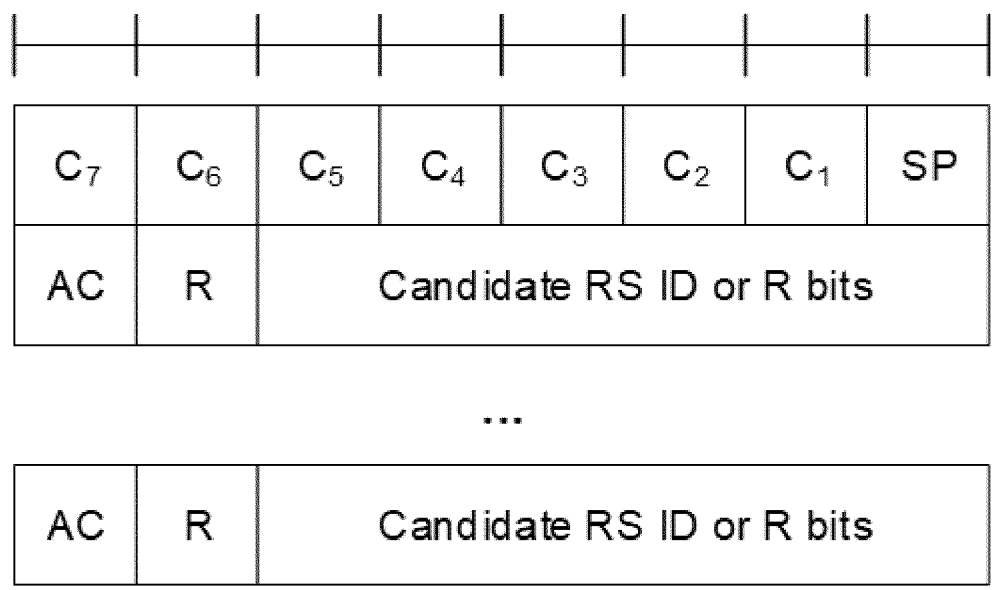
FIG. 2 illustrates a beam failure recovery medium access control control element with a single octet bitmap.

For the SCell beam failure recovery, when detecting a beam failure on at least one SCell, the UE may indicate the failure and recover the failed cell by transmitting a MAC control element (MAC CE), which may also be referred to as a BFR MAC CE. It is noted that when reference is made to BFR MAC CE, it may refer to BFR MAC CE, or to truncated BFR MAC CE, or a MAC CE used for beam failure recovery. FIG. 2 illustrates an example of a BFR and truncated BFR MAC CE with a single octet bitmap. FIG. 2 is used as an example to describe some of the features and the data structure of a BFR MAC CE that may be utilized in the context of some exemplary embodiments.

The BFR MAC CE indicates, to the network, the failed SCell index (C1-C7 bits illustrated in FIG. 2), an indication (AC bit illustrated in FIG. 2) on whether a candidate beam is available, and the index of the candidate beam (candidate RS ID in FIG. 2, if any) in the candidate beam RS list. The candidate beam RS list is a list of candidate beam indices that may be SSB and/or CSI-RS indices. A candidate beam may be determined to be available, if, for example, the quality and/or received signal strength of the candidate beam exceeds a threshold level. The MAC CE that indicates SCell failure and/or recovery information may also be used for PCell recovery by setting the PCell bit (SP bit illustrated in FIG. 2) to indicate the failure.

The transmission of the MAC CE may be preceded by a transmission of a dedicated RS signal that may indicate the beam failure event on the SCell. Alternatively or additionally, the UE may multiplex the BFR MAC CE in any available uplink (UL) grant.

For example, the below described MAC CEs may be used to indicate special cell (SpCell) failure. An SpCell may refer to a primary cell of a master cell group or to a primary secondary cell of a secondary cell group. It is further noted that a primary cell (PCell) may refer to a SpCell of a master cell group, and a primary secondary cell (PSCell) may refer to a SpCell of a secondary cell group.

BFR MAC CEs may be identified by a MAC subheader with a logical channel identifier (LCID/eLCID). A BFR MAC CE may have a variable size. It may comprise a bitmap in ascending order based on the ServCellIndex and beam failure recovery information, i.e. octets containing candidate beam availability indication (AC bit) for SCells indicated in the bitmap.

For BFR MAC CE, a single octet bitmap may be used when the highest ServCellIndex of this MAC entity's SCell, for which beam failure is detected, is less than 8. Otherwise, four octets may be used.

For truncated BFR MAC CE, a single octet bitmap (for example as illustrated in FIG. 2) may be used for example for the following cases:
 the highest ServCellIndex of this MAC entity's SCell configured with beam failure detection is less than 8; or
 beam failure is detected for SpCell and the SpCell is to be indicated in a truncated BFR MAC CE and the uplink shared channel (UL-SCH) resources available for transmission cannot accommodate the truncated BFR MAC CE with the four octets bitmap plus its subheader as a result of logical channel prioritization (LCP).

The fields in the BFR MAC CEs may be defined as follows with reference to FIG. 2:

- SP: This field may indicate beam failure detection for the SpCell of this MAC entity. The SP field may be set to 1 to indicate that beam failure is detected for SpCell when BFR MAC CE or truncated BFR MAC CE is to be included into a MAC protocol data unit (PDU) as part of a random access procedure. Otherwise, it is set to 0.
- Ci (BFR MAC CE): This field may indicate beam failure detection and the presence of an octet containing the AC field for the SCell with ServCellIndex i. The Ci field set to 1 indicates that beam failure is detected and the octet containing the AC field is present for the SCell with ServCellIndex i. The Ci field set to 0 indicates that the beam failure is not detected and an octet containing the AC field is not present for the SCell with ServCellIndex i. The octets containing the AC field are present in ascending order based on the ServCellIndex.
- Ci (Truncated BFR MAC CE): This field indicates beam failure detection for the SCell with ServCellIndex i. The Ci field set to 1 indicates that beam failure is detected and the octet containing the AC field for the SCell with ServCellIndex i may be present. The Ci field set to 0 indicates that the beam failure is not detected and the octet containing the AC field is not present for the SCell with ServCellIndex i. The octets containing the AC field, if present, are included in ascending order based on the ServCellIndex. The number of octets containing the
- AC field included is maximized, while not exceeding the available grant size. AC (available candidate): This field may indicate the presence of the Candidate RS ID field in this octet. If at least one of the SSBs with synchronization signal reference signal received power (SS-RSRP) above rsrp-ThresholdBFR amongst the SSBs in candidateBeamRSSCellList, or the CSI-RSs with CSI-RSRP above rsrp-ThresholdBFR amongst the CSI-RSs in candidateBeamRSSCellList is available, the AC field is set to 1; otherwise, it is set to 0. If the AC field is set to 1, the Candidate RS ID field is present. If the AC field set to 0, R bits are present instead.
- Candidate RS ID: This field is set to the index of an SSB with SS-RSRP above rsrp-ThresholdBFR amongst the SSBs in candidateBeamRSSCellList, or to the index of a CSI-RS with CSI-RSRP above rsrp-ThresholdBFR amongst the CSI-RSs in candidateBeamRSSCellList. The length of this field is 6 bits.
- R: Reserved bit, which may be set to 0.

The network (for example the network illustrated in FIG. 1A) may further support utilizing multiple transmission reception points (TRPs). This may be referred to as multiple transmission reception point (mTRP) operation. mTRP operation may support, for example, two or more TRPs. Thus, for example, the UE 100, 102 may receive data via a plurality of TRPs. The different TRPs may be controlled, for example, by the access point 104, such as a gNB.

Figure 1B:
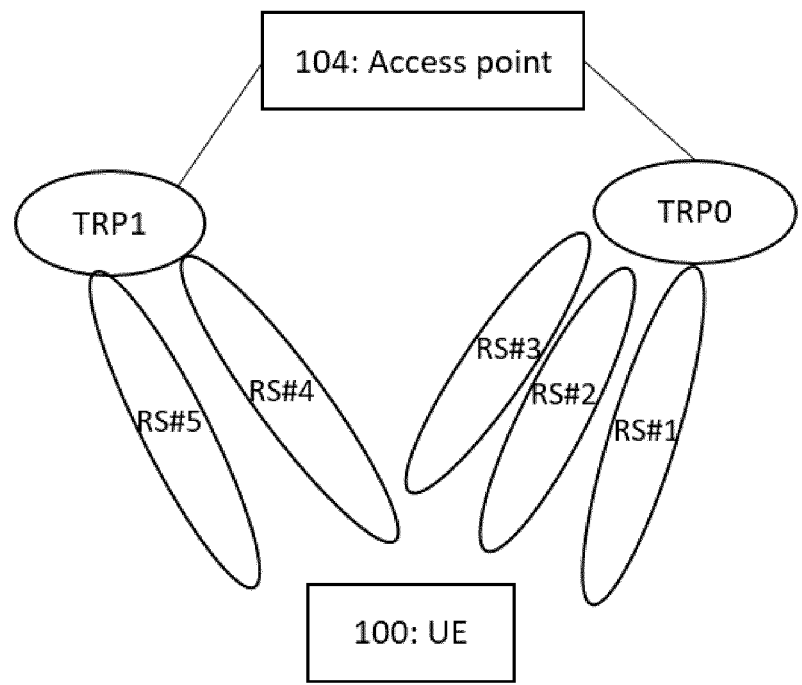

An example of such a system is illustrated in FIG. 1B, which may be understood to depict the system of FIG. 1A, but with greater accuracy with respect to the mTRP scenario. The mTRP operation may be implemented in such a manner that, instead of explicitly indicating the TRP identifier (ID), the control resource sets (CORESETs) may be associated to specific TRPs using a CORESETPoolIndex parameter [0 . . . 1]. CORESETs within a PDCCH configuration that have the same poolIndex may be assumed by the UE to be configured to be provided from the same (set of) TRP(s). Referring to FIG. 1B, two TRPs with CORESETPoolIndex 0 and 1 are shown. TRP0, i.e. the TRP having CORESETPoolIndex 0, provides three beams (RS #1, RS #2 and RS #3), and TRP1, i.e. the TRP having CORESETPoolIndex 1, provides two beams (RS #4 and RS #5). It should be noted that FIG. 1B is a non-limiting example illustration. In some examples, TRP0 and/or TRP1 may comprise one or more TRPs.

mTRP may also be configured for an inter-cell scenario (sometimes referred to as inter-cell mTRP), i.e. the TRPs may be associated with different cells. In inter-cell mTRP, the UE may be provided a configuration where the CORESETs of CORESETPoolIndex/TRP are provided by multiple cells (for example two). In some examples, the UE may be explicitly configured with CORESETs with more than one (for example two) distinct CORESETPoolIndex values that CORESETs, or the CORESETpoolIndex is associated with another cell than the current serving cell, for example associating a CORESET/Poolindex with a physical cell identity (PCI). In some examples, the UE may determine that it is configured with inter-cell mTRP communication, when the downlink reference signal indicated by an activated TCI state for PDCCH or physical downlink shared channel (PDSCH) for a CORESET is associated, or the quasi co-location (QCL) source of the signal is associated with a PCI other than the current serving cell. These should be understood as illustrative examples.

Herein mTRP operation may refer to single downlink control information (S-DCI) or multiple downlink control information (mDCI) operation. In mDCI operation, the CORESETPoolIndex value may be used to group CORESETs under separate groups. In other words, when CORESETs share the same group ID or CORESETPoolindex value, they may be considered to be in the same group. In S-DCI operation, the different CORESETs are not grouped, i.e. the same CORESETpoolindex value is configured for all the CORESETs. When configured with more than one value of CORESETpoolindex (for example two sets of CORESETs are configured in mDCI operation), the UE may be expected to monitor downlink control information (DCI) transmissions simultaneously from CORESETs associated with different pool index values. Currently, up to 2 values (k=0,1) may be configured.

However, currently there may be no support for indicating more than one TRP beam failure in order to facilitate beam failure recovery for mTRP operation. For example, if at least one of the beams (for example RS #1, RS #2, RS #3, RS #4, or RS #5 in FIG. 1B) fails, an efficient and reliable concept of how it is indicated to the network may be missing.

For example, if the UE 100 (for example configured for PDCCH reception and/or configured for beam failure detection) is served via beams RS #1 and RS #4, and RS #1 and RS #4 are in different BFD-RS sets of q0, and beam RS #1 fails, then the UE 100 may determine that it has experienced a failure on a subset of beams or a failure of a TRP or a failure of BFD-RS set. This may be referred to as partial beam failure or TRP failure. When all beams (i.e. all the BFD-RSs or all the reference signals in the failure detection set, i.e. in all the sets of q0) are in failure condition, then this may be referred to as full failure or full beam failure or cell-level beam failure.

As an example, when referring herein that a TRP1 has failed, it may refer to the failure of RSs in the BFD-RS set associated with the TRP1. In a further example, when referring herein that a TRP0 has failed, it may refer to the failure of RSs in the BFD-RS set associated with the TRP0. In other words, the TRP1 failure may refer to the failure of the BFD-RS set associated with the CORESETs under specific CORESETPoolIndex value(s) (for example 1). Similarly, the TRP0 failure may refer to the failure of the BFD-RS set associated with the CORESETs under specific CORESETpoolIndex value(s) (for example 0).

Some exemplary embodiments may be used to provide beam failure detection for mTRP operation by indicating TRP failure with or without a candidate beam, when the UE is configured to indicate cell-level failure, i.e. full failure, or when the UE is configured to indicate failure per TRP. Some exemplary embodiments may utilize signaling techniques, such as MAC CE encoding techniques or rules for various mTRP recovery schemes including, but not limited to: signaling support to indicate failure of all TRPs, signaling support to indicate failure of at least one TRP, and/or signaling support to indicate failure in the cell (failure on all TRPs may be interpreted by the UE as a failure of an entire cell).

It should be noted that herein TRP may refer to the BFD-RS set associated with one or more specific TRPs, and TRP-specific failure may refer to the failure of a specific q0 set. In some exemplary embodiments described below, two TRPs, i.e. two BFD-RS sets of q0, may be used as an example. However, some exemplary embodiments may also be applied to more than two TRPs.

Figure 3:
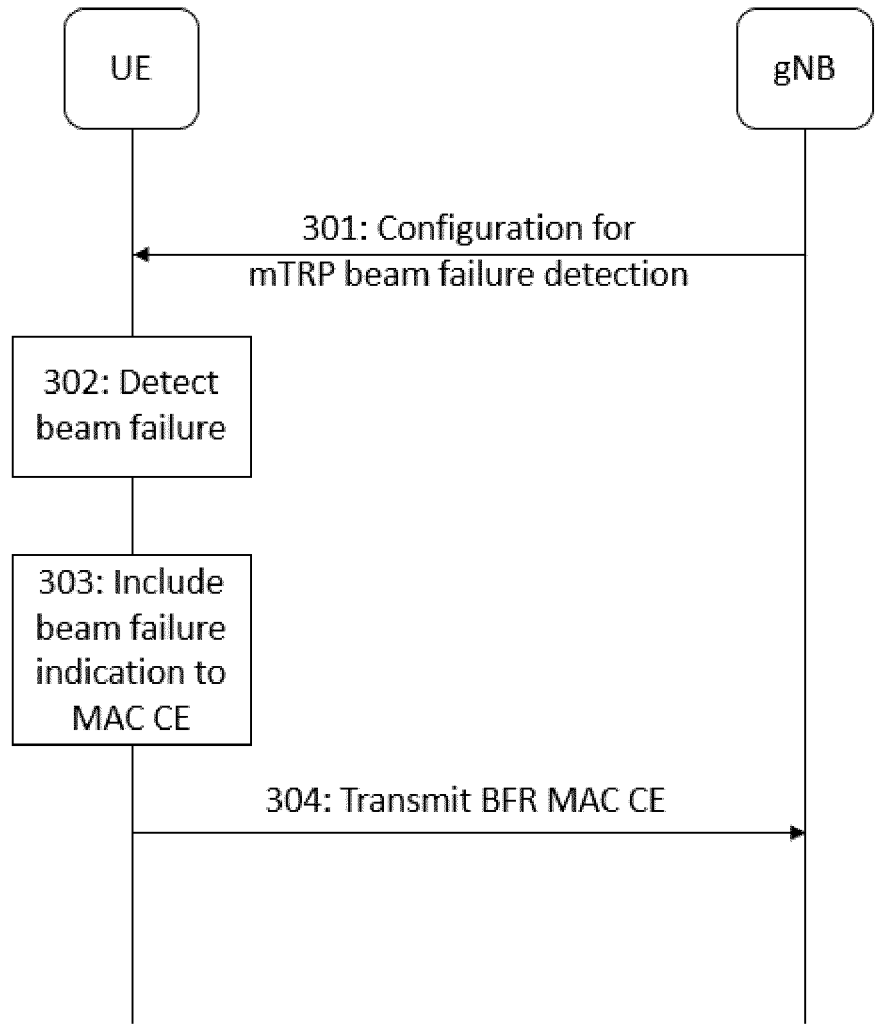
FIG. 3 illustrates a signaling diagram according to another exemplary embodiment.

FIG. 3 illustrates a signaling diagram according to an exemplary embodiment. An access point such as a gNB configures 301 a UE for mTRP beam failure detection. For example, the UE may be configured to detect one or more TRP-specific beam failures and to indicate the one or more TRP-specific beam failures to the base station. After detecting 302 at least one beam failure, the UE may include 303 the beam failure indication data into at least a part of the MAC CE fields for example with the following logic, which may be configured to the UE by the access point in the configuration 301.

If a first TRP (denoted as TRP0) has failed, the UE may include the indication of the beam failure detected on TRP0 first by setting a first TRP failure information field indicating the beam failure of TRP0. The indication may be followed by the candidate beam information of TRP0. The candidate beam information may comprise, for example, an AC field and/or candidate RS index.

If the failure of TRP0 is indicated by the first TRP failure information field, the UE may also include a second set of TRP failure information to the MAC CE. If a second TRP (denoted as TRP1) has failed, the UE may indicate the failed second TRP by setting the second TRP failure information field to indicate the second beam failure. If TRP1 has not failed, the UE may set the second TRP failure information field to indicate that TRP1 has not failed.

If TRP1 has failed, but TRP0 has not failed, the UE may encode the TRP1 beam failure information into the first TRP failure information field. The indication may be followed by the candidate beam information of TRP1. The candidate beam information may comprise, for example, an AC field and/or candidate RS index.

If the failure information of TRP1 is encoded first in the MAC CE, the second TRP information field may not be encoded. If TRP1 is indicated first, then the MAC CE does not indicate TRP0 failure. In other words, the above TRP failure information, or octet, comprising the TRP failure information and/or AC field encoding is performed per serving cell indicated by the bitmap comprising the SpCell 'P' bit and Ci fields.

After encoding the beam failure indication data to the MAC CE, the UE transmits 304 the MAC CE comprising the encoded beam failure indication data to the access point. The access point may then initiate a beam failure recovery procedure for the UE based on the beam failure indication data comprised in the received MAC CE.

In the above exemplary embodiment, the order of the TRPs encoded in the MAC CE is just an example, and the encoding order of the TRPs may also be reversed. In other words, TRP1 may also be encoded first before TRP0 in the above exemplary embodiment.

In any of the exemplary embodiments described herein, the TRP # failure may refer to the failure of the BFD-RS set # or BFD-RS set associated with CORESETPoolIndex # or any higher layer parameter index # that is used to group the BFD-RS to a specific set of q0.

Figure 4:
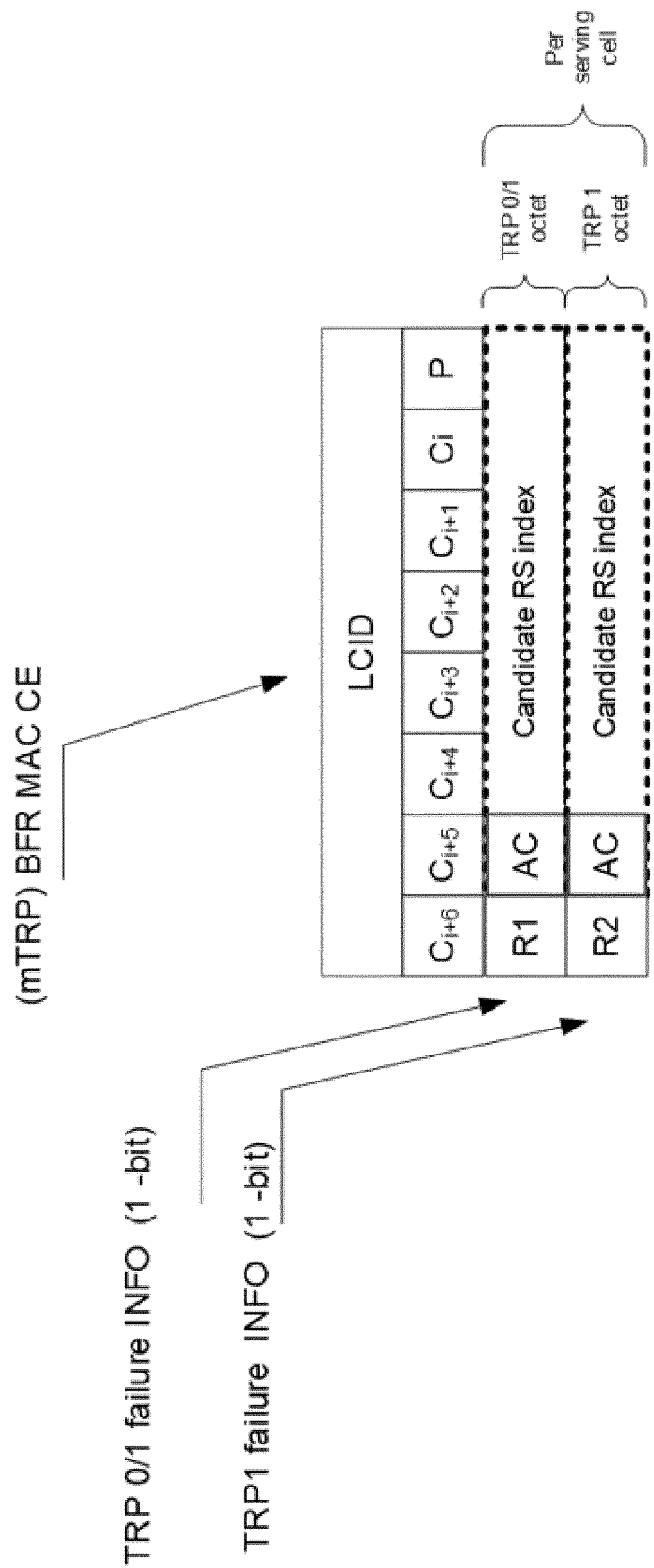
FIGS. 4 and 5 illustrate medium access control control elements according to some exemplary embodiments.

FIG. 4 illustrates a MAC CE according to an exemplary embodiment. In this exemplary embodiment, beam failure of at least one TRP has been detected for a serving cell (for example SpCell indicated by the 'P' bit). In this case, the R1 bit indicates whether the failed TRP is TRP0 or TRP1. If the R1 bit is set to 1, this indicates that TRP1 has failed. If the R1 bit is set to 0, this indicates that at least TRP0 has failed. Similarly, the procedures herein may be applicable to any serving cell (for example SpCell and/or SCell).

When R1 is set to indicate TRP0 failure, the candidate beam information (for example AC and/or candidate RS index) is encoded for TRP0, and another field (octet) for TRP1 information follows.

When R1 is set to indicate TRP1 failure, the candidate beam information (for example AC and/or candidate RS index) is encoded for TRP1, and no further octet follows, since the TRP0 failure is indicated first if it has occurred.

When the R1 bit indicates failure of TRP0 (i.e. R1 is set to 0), then the R2 bit indicates whether TRP1 has failed. If the R2 bit indicates TRP1 failure, then the candidate beam information (for example AC and/or candidate RS index) in the second field (octet) is encoded for TRP1.

In another exemplary embodiment, the failure of a TRP may be indicated by setting a TRP-specific field in a MAC CE to a specific value. There may be one or more TRPs and TRP-specific fields. For example, the value of a first bit may be set to '1' if a first TRP is in failure, and otherwise the first bit may be set to '0' to indicate no failure on the first TRP. As another example, the value of a second bit may be set to '1' if a second TRP is in failure, and otherwise the second bit may be set to '0' to indicate no failure on the second TRP. As another example, the value of a third bit may be set to '1' if a third TRP is in failure, and otherwise the third bit may be set to '0' to indicate no failure on the third TRP. In other words, there may be a bit for each the of the TRPs indicating whether the TRP has failed. For example, the TRP-specific fields may be listed in ascending or descending order in the MAC CE, and a bit may be set in each field in the TRP information field (for example octet) to indicate the failed or not failed status. The TRP fields may be listed per failed serving cell indicated in the MAC CE.

Alternatively, a bitmap may comprise one or more bits or octets that indicate the TRP-specific failure status (failed or not failed) for each of the indicated serving cells in the MAC CE. For example, a serving cell bit may be set to a specific value to indicate failure in a specific serving cell. For example, for each serving cell for which failure is indicated, the TRP-specific failure status may be indicated.

Figure 5:
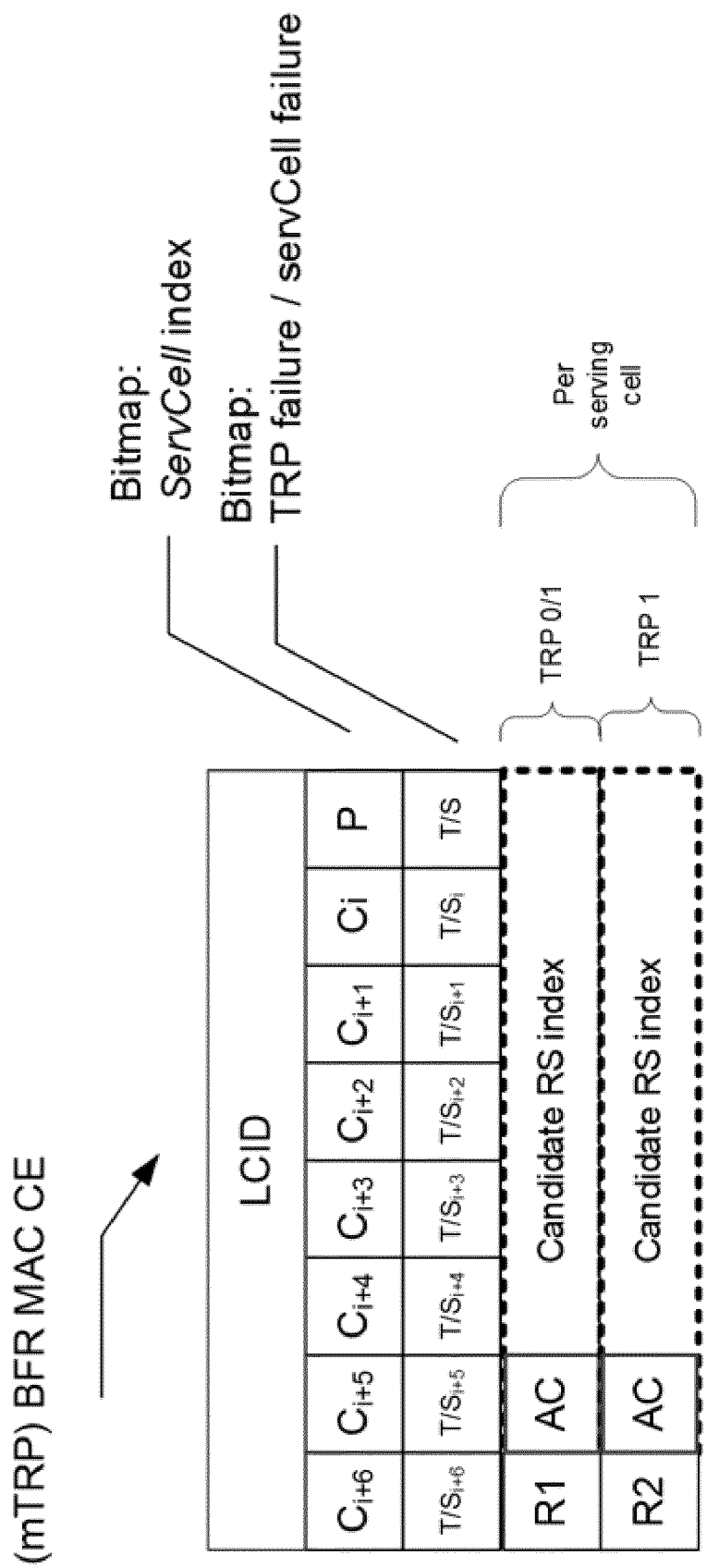

FIG. 5 illustrates a MAC CE according to another exemplary embodiment, wherein the MAC CE comprises a bitmap to indicate whether a TRP-specific beam failure or cell-level beam failure has occurred. The serving cell specific T/S field indicates whether the UE indicates TRP-specific failure (T) or serving cell level failure (S). An example of the MAC CE encoding logic for this exemplary embodiment is presented in the following.

In one example, the UE may indicate a beam failure of at least one serving cell for example by using the ServCell index bitmap, and the T/S field may be set to indicate TRP-specific beam failure. In this case, the T/S field indicates the failure of one of the TRPs, wherein the TRP ID is encoded in the R1 bit of the candidate beam octet, i.e. the first octet comprising R1, AC, and candidate RS index. For example, the UE may be configured to indicate this when one TRP is in failure. Alternatively, it may indicate the failure of both TRPs with the encoding logic described above with reference to FIG. 3. Alternatively, it may indicate the failure of both TRPs. In this case, both candidate beam octets (R1, AC, first candidate RS index; R2, AC, second candidate RS index) may be encoded per indicated serving cell.

In another example, a field (for example the T/S field) may be set to indicate TRP-specific beam failure, and both candidate beam octets may be encoded to the MAC CE.

In another example, a field (for example the T/S field) may be set to indicate cell-level failure (for example both TRPs have failed), and both TRP-specific candidate beam octets may be encoded to the MAC CE.

In another example, when the UE indicates the beam failure of a (serving) cell, it may set the T/S field to indicate serving cell failure, and the candidate beam information octet (R1, AC, candidate RS index) may be encoded for the cell. In case a cell-level failure has occurred or been declared for SpCell, the UE may omit the TRP-specific candidate beam information for the SpCell, when MAC CE is provided using CBRA.

In another example, the bitmap length to indicate the TRP-specific failure or cell failure may be determined based on the number of serving cells, for which failure is indicated based on the Ci fields and the P field.

In some exemplary embodiments, if the UE has determined that new candidate beam(s) are not available for both or any of the failed TRPs (i.e. failure of RSs in the BFD-RS set associated with the TRPs), then the UE may initiate a random access procedure for beam failure recovery on the SpCell or other serving cell. In another example, the UE may provide a MAC CE indicating SpCell level (or serving cell level) failure (for example instead TRP-specific failure) for a serving cell, where no candidate beams were available to be indicated for the failed TRPs. For example, the BFR MAC CE illustrated in FIG. 2 may be used for indicating the cell-level failure when there are no candidate beams available for both (or all of the) TRPs. This may be an implicit indication by the UE to indicate that it has determined that no candidates are available for the failed TRPs.

It should be noted that herein BFR MAC CE may refer to a truncated BFR MAC CE or to a BFR MAC CE. In an example, when the UE sends a BFR MAC CE, it may indicate to the network that the UE recovers a cell (instead of one or more TRPs).

In another exemplary embodiment, if the UE has determined that new candidate beam(s) are not available for both or all of the failed TRPs, then the UE may set a field in a MAC CE (for example the T/S field) to indicate cell-level failure. For example, when indicating the cell-level failure, the UE may omit candidate beam information from the MAC CE for SpCell, when the MAC CE is provided using CBRA. In another example, if there are no candidate beams available for any of the failed TRPs for an SCell (or for a serving cell), then the UE may indicate cell-level failure and omit candidate beam information fields from the MAC CE. As an example, when the UE is configured with mTRP communication, then the UE may implicitly indicate the failure of TRPs and that there are no new candidate beam(s) available for the failed TRPs, when the UE indicates a serving cell level failure using a specific field in a MAC CE, or uses a BFR MAC CE or any MAC that is used for beam failure recovery. As a further example, the new candidate beam for one or more TRPs may be indicated by the selected DL RS (SSB or CSI-RS) for the random access procedure.

The UE may be configured for mTRP communication, if, for example more than one CORESETPoolIndex values are configured for the UE, or more than one sets of BFD-RS are configured for the UE.

In another exemplary embodiment when UE has determined that both TRPs are in failure but at least one of the TRPs has a candidate beam available, UE may initiate beam failure recovery for the failed TRP(s).

In another exemplary embodiment, if the UE cannot detect or indicate beam failure, or the UE has determined that new candidate beam(s) are not available for both or all of the failed TRPs, then the UE may encode, or include, in a MAC CE the TRP failure information, or octet, comprising the TRP failure information and/or AC field for both or all of the failed TRPs. The new candidate beam for one or more TRPs may then be further indicated by the selected DL RS (SSB or CSI-RS) for the random access procedure initiated for beam failure recovery.

The MAC CE illustrated in FIG. 5 may be applicable for one or more of the following: SpCell, SCell, and/or multiple SCells. The information may be encoded as described above per serving cell that has been indicated for failure.

Figure 6:
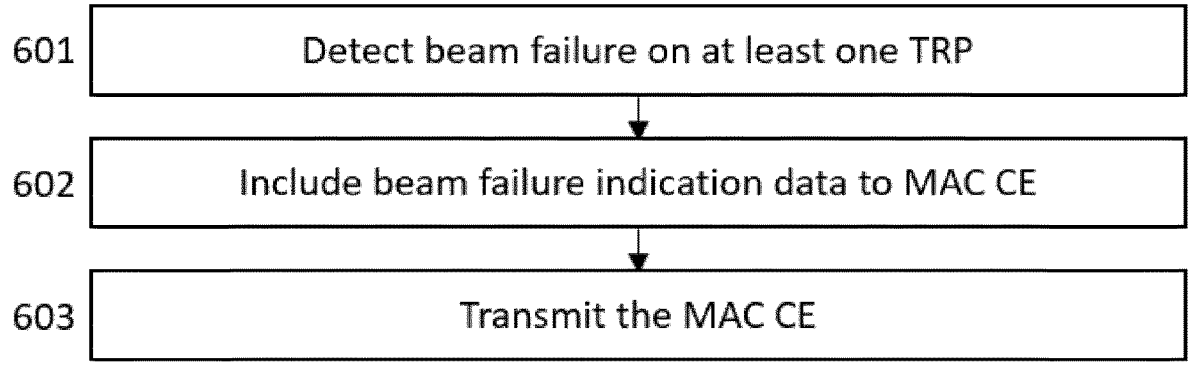
FIGS. 6-9 illustrate flow charts according to some exemplary embodiments.

FIG. 6 illustrates a flow chart according to an exemplary embodiment. The functions illustrated in FIG. 6 may be performed by an apparatus such as a UE, or an apparatus comprised in a UE. Referring to FIG. 6, a beam failure is detected 601 on at least one TRP of a plurality of TRPs, the apparatus being configured to communicate with the plurality of TRPs. One or more beam failure indication data is included 602 into a first MAC CE, wherein the one or more beam failure indication data indicates the beam failure detected on the at least one TRP. The one or more beam failure indication data comprises at least a first bit that comprises a first value and a second value, wherein the first value of the first bit indicates a first TRP of the plurality of TRPS at least on which the beam failure is detected. The second value of the first bit may indicate, for example, a second TRP of the plurality of TRPs on which the beam failure is detected. Alternatively, the second value of the first bit may indicate that no beam failure is detected at least on the first TRP. The first MAC CE comprising the one or more beam failure indication data is transmitted 603 to an access point.

Figure 7:
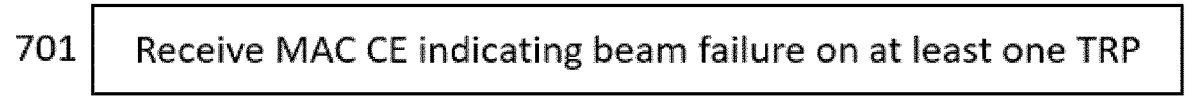

FIG. 7 illustrates a flow chart according to another exemplary embodiment. The functions illustrated in FIG. 7 may be performed by an apparatus such as an access point, or an apparatus comprised in an access point. Referring to FIG. 7, a MAC CE indicating beam failure on at least one TRP is received 701 from a UE. The MAC CE comprises at least a first bit comprising a first value and a second value, wherein the first value of the bit indicates a beam failure on at least a first TRP. The second value of the first bit may indicate, for example, that the beam failure is on a second TRP of the plurality of TRPs. Alternatively, the second value of the first bit may indicate that no beam failure is detected on the first TRP.

Figure 8:
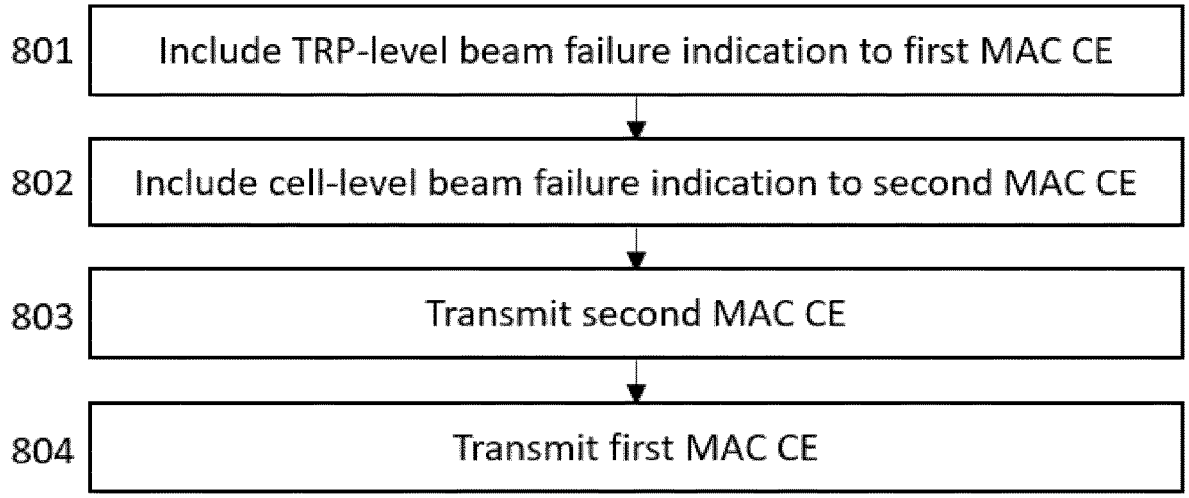

FIG. 8 illustrates a flow chart according to another exemplary embodiment. The functions illustrated in FIG. 8 may be performed by an apparatus such as a UE, or an apparatus comprised in a UE. Referring to FIG. 8, a first set of beam failure indication data indicating at least one TRP on which the beam failure is detected is included 801 into a first MAC CE. A second set of beam failure indication data indicating at least one cell-level beam failure is included 802 to a second MAC CE. For example, the legacy BFR MAC CE (such as the BFR MAC CE illustrated in FIG. 2) may be used as the second BFR MAC CE for cell(s) for which full cell-level failure is indicated, and the new BFR MAC CE (for example the BFR MAC CE illustrated in FIG. 4 or FIG. 5) may be used as the first MAC CE for cell(s) for which TRP-specific failure is indicated. The second MAC CE is transmitted 803 to an access point. The first MAC CE is transmitted 804 to the access point.

In one example, the UE may indicate both the cell-level BFR MAC CE and the TRP-level BFR MAC CE in a single MAC PDU.

In another example, the cell-level BFR MAC CE may be prioritized over the TRP-level BFR MAC CE. In other words, the second BFR MAC CE may be transmitted before the first BFR MAC CE.

In another example, the (cell-level or TRP-level) BFR MAC CE, in which the SpCell is indicated as failed, may be prioritized in case the SpCell has failed.

Figure 9:
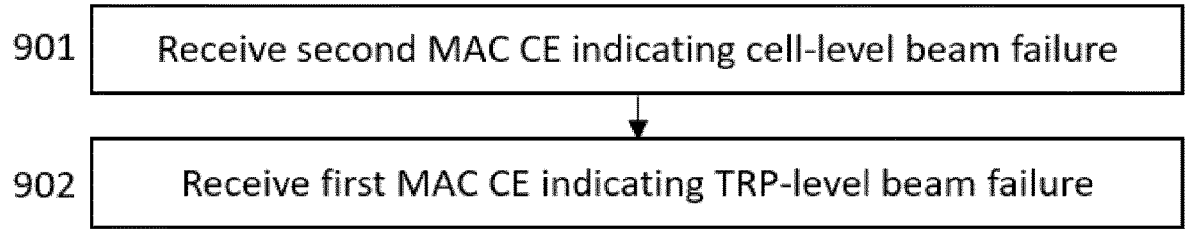

FIG. 9 illustrates a flow chart according to another exemplary embodiment. The functions illustrated in FIG. 9 may be performed by an apparatus such as an access point, or an apparatus comprised in an access point. Referring to FIG. 9, a second MAC CE is received 901, wherein the second MAC CE comprises a second set of beam failure indication data indicating at least one cell-level beam failure. A first MAC CE is received 902, wherein the first MAC CE comprises a first set of beam failure indication data indicating at least one TRP on which the beam failure is detected.

In some exemplary embodiments, a MAC CE may comprise at least one of:
1) a field value/sub-header value, for example LCID, indicating that the MAC CE is a MAC CE indicating failure of at least one TRP of at least one serving cell, and/or
2) a field value/sub-header value, for example LCID, of the legacy BFR MAC CE, wherein specific fields of the legacy BFR MAC CE may be encoded when the UE is configured with mTRP beam failure detection and recovery. The mTRP failure detection may be determined based on the configuration of more than one set of q0.

In another exemplary embodiment, a MAC CE may comprise a set of fields per cell and at least one field specific to a TRP, wherein the field may comprise of:
1) a bit indicating whether the failure is for TRP0 or TRP1,
2) an AC field indicating whether a new candidate beam is available, for example above a reference signal received power (RSRP) threshold, and
3) a candidate RS index.

The functions and/or blocks described above by means of FIGS. 3 and 6-8 are in no absolute chronological order, and some of them may be performed simultaneously or in an order differing from the described one. Other functions and/or blocks may also be executed between them or within them.

A technical advantage provided by some exemplary embodiments is that they may enable an improved beam failure recovery procedure to cover mTRP operation. Some exemplary embodiments may improve communication efficiency, and enable the UE to recover more efficiently from a beam failure. Furthermore, in some exemplary embodiments, an octet can be omitted from the MAC CE, when at least one but not all TRPs are in failure. In addition, two or more TRPs can be indicated to be in failure.

Figure 10:
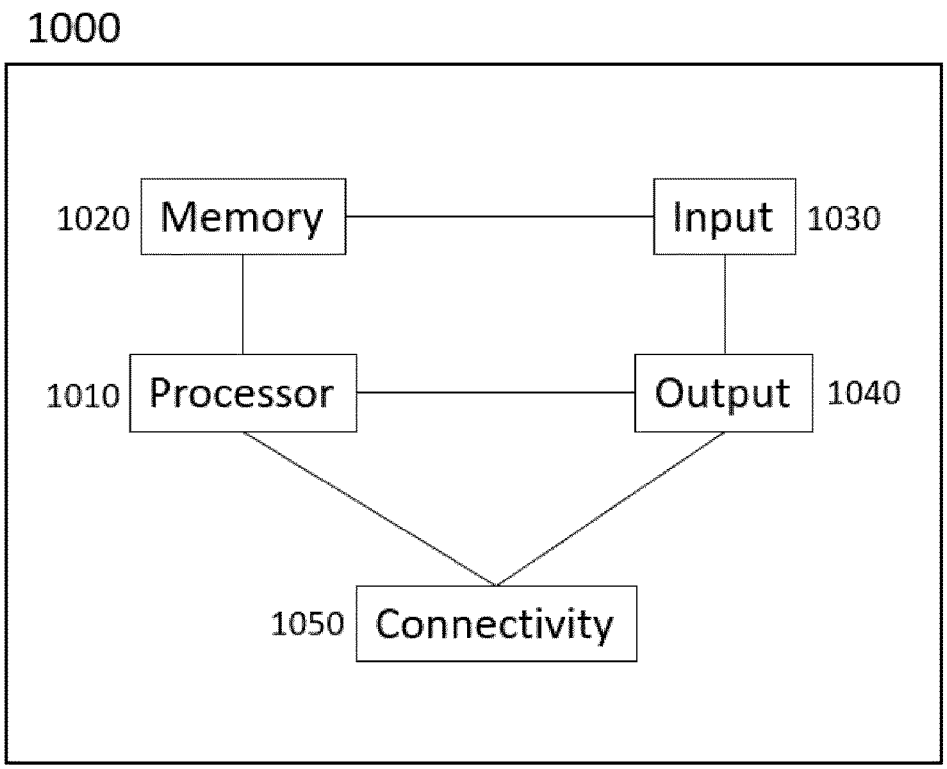
FIGS. 10-11 illustrate apparatuses according to some exemplary embodiments.

FIG. 10 illustrates an apparatus 1000, which may be an apparatus such as, or comprised in, a terminal device, according to an exemplary embodiment. A terminal device may also be referred to as a UE or user equipment herein. The apparatus 1000 comprises a processor 1010. The processor 1010 interprets computer program instructions and processes data. The processor 1010 may comprise one or more programmable processors. The processor 1010 may comprise programmable hardware with embedded firmware and may, alternatively or additionally, comprise one or more application-specific integrated circuits (ASICs).

The processor 1010 is coupled to a memory 1020. The processor is configured to read and write data to and from the memory 1020. The memory 1020 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1020 stores computer readable instructions that are executed by the processor 1010. For example, non-volatile memory stores the computer readable instructions and the processor 1010 executes the instructions using volatile memory for temporary storage of data and/or instructions.

The computer readable instructions may have been pre-stored to the memory 1020 or, alternatively or additionally, they may be received, by the apparatus, via an electromagnetic carrier signal and/or may be copied from a physical entity such as a computer program product. Execution of the computer readable instructions causes the apparatus 1000 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1000 may further comprise, or be connected to, an input unit 1030. The input unit 1030 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1030 may comprise an interface to which external devices may connect to.

The apparatus 1000 may also comprise an output unit 1040. The output unit may comprise or be connected to one or more displays capable of rendering visual content, such as a light emitting diode (LED) display, a liquid crystal display (LCD) and/or a liquid crystal on silicon (LCoS) display. The output unit 1040 may further comprise one or more audio outputs. The one or more audio outputs may be for example loudspeakers.

The apparatus 1000 further comprises a connectivity unit 1050. The connectivity unit 1050 enables wireless connectivity to one or more external devices. The connectivity unit 1050 comprises at least one transmitter and at least one receiver that may be integrated to the apparatus 1000 or that the apparatus 1000 may be connected to. The at least one transmitter comprises at least one transmission antenna, and the at least one receiver comprises at least one receiving antenna. The connectivity unit 1050 may comprise an integrated circuit or a set of integrated circuits that provide the wireless communication capability for the apparatus 1000. Alternatively, the wireless connectivity may be a hardwired application-specific integrated circuit (ASIC). The connectivity unit 1050 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 1000 may further comprise various components not illustrated in FIG. 10. The various components may be hardware components and/or software components.

Figure 11:
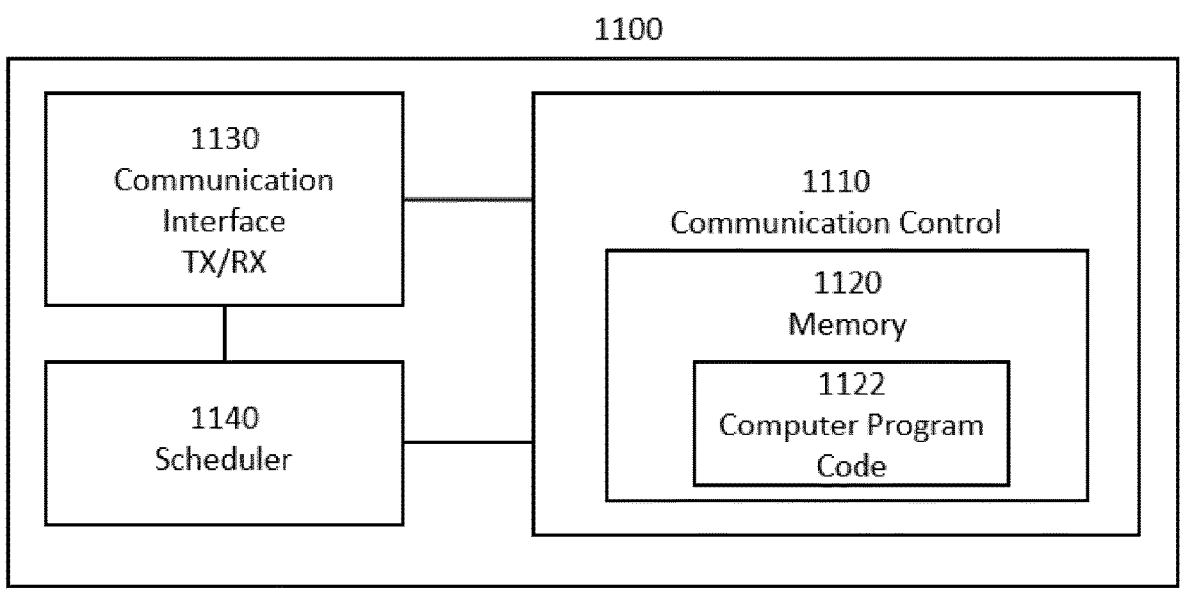

The apparatus 1100 of FIG. 11 illustrates an exemplary embodiment of an apparatus such as, or comprised in, an access point such as a gNB. The apparatus may comprise, for example, a circuitry or a chipset applicable to an access point to realize some of the described exemplary embodiments. The apparatus 1100 may be an electronic device comprising one or more electronic circuitries. The apparatus 1100 may comprise a communication control circuitry 1110 such as at least one processor, and at least one memory 1120 including a computer program code (software) 1122 wherein the at least one memory and the computer program code (software) 1122 are configured, with the at least one processor, to cause the apparatus 1100 to carry out some of the exemplary embodiments described above.

The memory 1120 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1100 may further comprise a communication interface 1130 comprising hardware and/or software for realizing communication connectivity according to one or more communication protocols. The communication interface 1130 comprises at least one transmitter (TX) and at least one receiver (RX) that may be integrated to the apparatus 1100 or that the apparatus 1100 may be connected to. The communication interface 1130 provides the apparatus with radio communication capabilities to communicate in the cellular communication system. The communication interface may, for example, provide a radio interface to terminal devices. The apparatus 1100 may further comprise another interface towards a core network such as the network coordinator apparatus and/or to the access nodes of the cellular communication system. The apparatus 1100 may further comprise a scheduler 1140 that is configured to allocate resources.

As used in this application, the term "circuitry" may refer to one or more or all of the following:
  a. hardware-only circuit implementations (such as implementations in only analog and/or digital circuitry) and
  b. combinations of hardware circuits and software, such as (as applicable):
    i. a combination of analog and/or digital hardware circuit(s) with software/firmware and
    ii. any portions of hardware processor(s) with software (including digital signal processor(s)), software, and memory(ies) that work together to cause an apparatus, such as a mobile phone, to perform various functions) and
  c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory including computer program code, wherein the at least one memory and the computer program code are configured, with the at least one processor, to cause the apparatus to:
   detect a beam failure on at least one beam failure detection reference signal, BFD-RS, set of a plurality of BFD-RS sets, the apparatus being configured to communicate with an access point supporting the plurality of BFD-RS sets;
   include one or more beam failure indication data into a first medium access control, MAC, control element, CE, wherein the one or more beam failure indication data indicates the beam failure detected on the at least one BFD-RS set;
   wherein the one or more beam failure indication data comprises at least a first bit,
   wherein the first bit has a first value when the one or more beam failure indication data includes candidate beam information encoded for a first BFD-RS set and candidate beam information encoded for a second BFD-RS set of the plurality of BFD-RS sets, wherein the first value further indicates that the beam failure is detected at least on the first BFD-RS set, and
   wherein the first bit has a second value when the one or more beam failure indication data includes candidate beam information encoded for only the second BFD-RS set of the plurality of BFD-RS sets, wherein the second value further indicates that the beam failure is detected on the second BFD-RS set; and
   transmit, to the access point, the first MAC CE comprising the one or more beam failure indication data.

2. An apparatus according to claim 1, wherein the second value of the first bit indicates that no beam failure is detected at least on the first BFD-RS set of the plurality of BFD-RS sets.

3. An apparatus according to claim 2, wherein, if the first bit is set to the first value, the one or more beam failure indication data further comprises at least a second bit indicating whether the beam failure is detected on the second BFD-RS set.

4. An apparatus according to claim 1, wherein the one or more beam failure indication data further indicates whether the beam failure is for a BFD-RS set level beam failure or for a cell-level beam failure.

5. An apparatus according to claim 4, wherein the BFD-RS set level beam failure or the cell-level beam failure is indicated by a bitmap within the one or more beam failure indication data, wherein a length of the bitmap is determined based at least partly on a number of serving cells for which the beam failure is detected.

6. An apparatus according to claim 1, wherein the apparatus is further caused to:
   transmit, to the access point, a second medium access control, MAC, control element, CE, indicating a cell-level beam failure.

7. An apparatus according to claim 1, wherein the plurality of BFD-RS sets are supported by one or more access points.

8. An apparatus comprising at least one processor, and at least one memory including computer program code, wherein the at least one memory and the computer program code are configured, with the at least one processor, to cause the apparatus to:
   receive, from a terminal device, a medium access control, MAC, control element, CE, comprising one or more beam failure indication data indicating beam failure on at least one beam failure detection reference signal, BFD-RS, set of a plurality of BFD-RS sets,
   wherein the one or more beam failure indication data comprises at least a first bit,
   wherein the first bit has a first value when the one or more beam failure indication data includes candidate beam information encoded for a first BFD-RS set and candidate beam information encoded for a second BFD-RS set of the plurality of BFD-RS sets, wherein the first value further indicates that the beam failure is detected at least on the first BFD-RS set, and
   wherein the first bit has a second value when the one or more beam failure indication data includes candidate beam information encoded for only the second BFD-RS set of the plurality of BFD-RS sets, wherein the second value further indicates that the beam failure is detected on the second BFD-RS set.

9. An apparatus according to claim 8, wherein the plurality of BFD-RS sets are supported by one or more access points, wherein the apparatus is one of the one or more access points.

10. A method comprising:
    detecting, by a terminal device, a beam failure on at least one beam failure detection reference signal, BFD-RS, set of a plurality of BFD-RS sets, the terminal device being configured to communicate with an access point supporting the plurality of BFD-RS sets;
    including, by the terminal device, one or more beam failure indication data into a first medium access control, MAC, control element, CE, wherein the one or more beam failure indication data indicates the beam failure detected on the at least one BFD-RS set;
    wherein the one or more beam failure indication data comprises at least a first bit,
    wherein the first bit has a first value when the one or more beam failure indication data includes candidate beam information encoded for a first BFD-RS set and candidate beam information encoded for a second BFD-RS set of the plurality of BFD-RS sets, wherein the first value further indicates that the beam failure is detected at least on the first BFD-RS set, and
    wherein the first bit has a second value when the one or more beam failure indication data includes candidate beam information encoded for only the second BFD-RS set of the plurality of BFD-RS sets, wherein the second value further indicates that the beam failure is detected on the second BFD-RS set;
    transmitting, by the terminal device, to the access point, the first MAC CE comprising the one or more beam failure indication data.

* * * * *